United States Patent
Schoon

(10) Patent No.: US 10,465,811 B2
(45) Date of Patent: Nov. 5, 2019

(54) PRESSURE RELIEF VALVE

(71) Applicant: TRW Automotive U.S. LLC, Livonia, MI (US)

(72) Inventor: Benjamin W. Schoon, Lafayette, IN (US)

(73) Assignee: TRW AUTOMOTIVE U.S. LLC, Livonia, MI (US)

( * ) Notice: Subject to any disclaimer, the term of this patent is extended or adjusted under 35 U.S.C. 154(b) by 0 days.

(21) Appl. No.: 15/831,458

(22) Filed: Dec. 5, 2017

(65) Prior Publication Data
US 2019/0170265 A1 Jun. 6, 2019

(51) Int. Cl.
| F16K 17/06 | (2006.01) |
| B62D 5/087 | (2006.01) |
| B62D 5/08 | (2006.01) |
| F16K 17/04 | (2006.01) |
| F16K 17/10 | (2006.01) |

(52) U.S. Cl.
CPC ............... *F16K 17/06* (2013.01); *B62D 5/08* (2013.01); *B62D 5/087* (2013.01); *F16K 17/046* (2013.01); *F16K 17/105* (2013.01); *Y10T 137/8671* (2015.04); *Y10T 137/86767* (2015.04)

(58) Field of Classification Search
CPC ........... F16K 17/06; B62D 5/08; B62D 5/087; Y10T 137/8671; Y10T 137/86767
See application file for complete search history.

(56) References Cited

U.S. PATENT DOCUMENTS

| 4,982,762 A * | 1/1991 | Lee et al. ............. A01B 63/102 137/614.17 |
| 5,603,348 A * | 2/1997 | Geringer ............. F16K 17/0433 137/454.5 |
| 7,063,100 B2 * | 6/2006 | Liberfarb ............. G05D 7/0133 137/101 |
| 8,631,862 B2 * | 1/2014 | June ..................... E21B 33/038 137/614.04 |

* cited by examiner

*Primary Examiner* — Kevin L Lee
(74) *Attorney, Agent, or Firm* — Tarolli, Sundheim, Covell & Tummino LLP

(57) ABSTRACT

A pressure relief valve for a fluid power assist steering system. The valve includes a housing and a spool disposed in the housing. The spool defines a cavity and has a first end and a second end. The spool is movable in the housing to limit an output pressure of the pump. A poppet seat is secured to the second end of the spool. A poppet is disposed in the cavity. A poppet spring biases the poppet into engagement with the poppet seat. A set screw is received in the first end of the spool. The set screw is rotatable relative to the spool to adjust a compression level of the poppet spring.

13 Claims, 2 Drawing Sheets

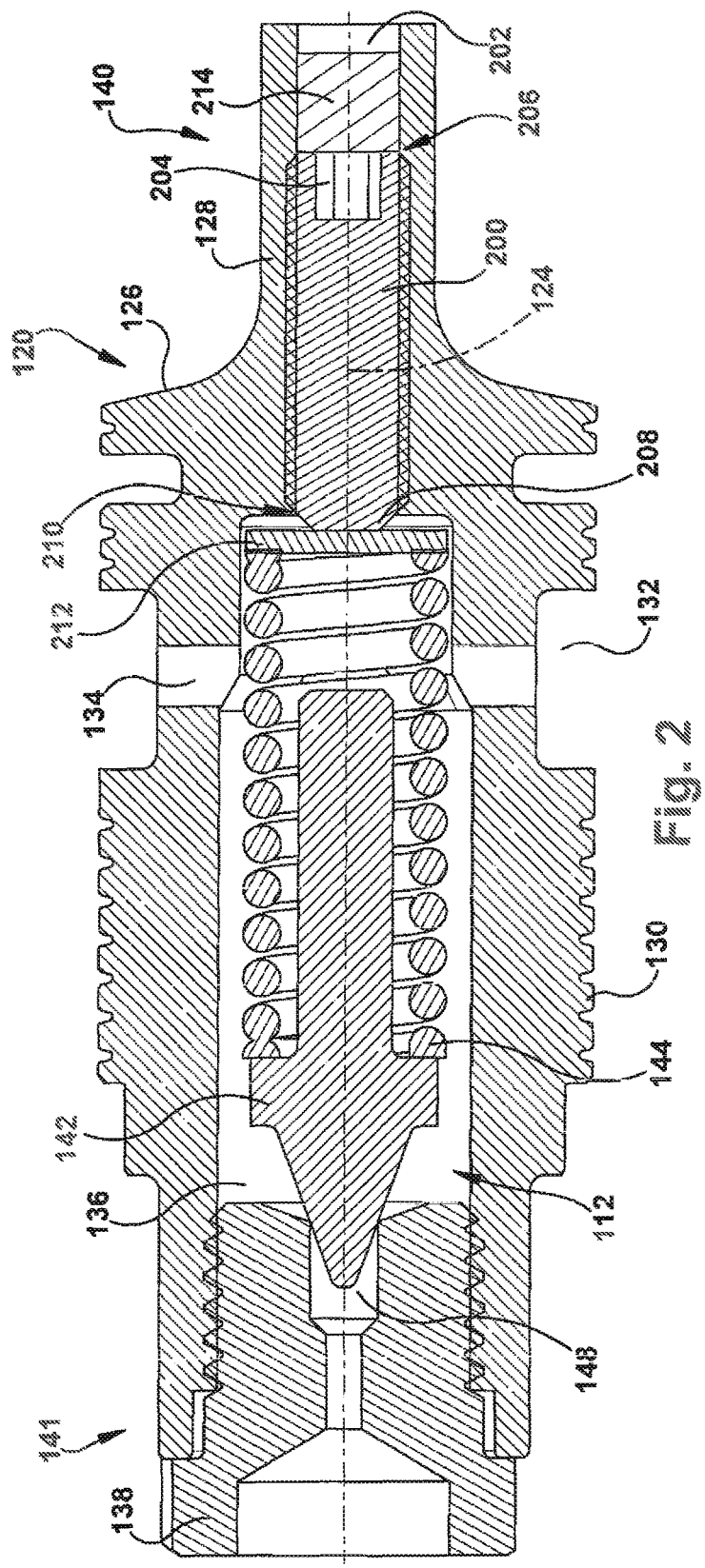

PRESSURE RELIEF VALVE

FIELD OF THE INVENTION

The present invention relates to a valve assembly and, in particular, a pressure relief valve for controlling output pressure in a pump of a fluid power assist steering system.

BACKGROUND

Fluid power assist steering systems can include a pump for providing hydraulic pressure for operation of the assist steering system. Output pressure demands on the pump can vary with pump flow and system load restriction. However, the output pressure should be limited to a predetermined maximum output pressure in order to protect the fluid power assist steering system, the pump, and other system components from damage. The pump is typically provided with a relief valve to limit the output pressure.

The relief valve can include a spool having a poppet valve assembly. The poppet valve assembly includes a poppet spring that biases a poppet against a poppet seat. The poppet is moved away from the poppet seat if the predetermined maximum output pressure is exceeded, which causes a reduction in output pressure of the pump. The force applied by the poppet spring to the poppet determines the pressure at which the poppet valve assembly opens, thus establishing the predetermined maximum output pressure of the pump.

In prior art poppet valve assemblies, the force applied by the poppet spring is controlled by shims that are used to set the position of the poppet seat relative to an end of the spool. Varying the number of shims or using shims of different thickness adjusts the force applied to the poppet by the poppet spring. However, the use of shims requires disassembly and assembly of the relief valve every time an adjustment is made. Furthermore, the shims provide poor adjustment resolution of the predetermined maximum output pressure.

SUMMARY OF THE INVENTION

According to one aspect of the invention, a pressure relief valve for a fluid power assist steering system is disclosed. The pressure relief valve includes a housing and a spool disposed in the housing. The spool defines a cavity and has a first end and a second end. The spool is movable in the housing to limit an output pressure of the pump. A poppet seat is secured to the second end of the spool. A poppet is disposed in the cavity. A poppet spring biases the poppet into engagement with the poppet seat. A set screw is received in the first end of the spool. The set screw is rotatable relative to the spool to adjust a compression level of the poppet spring.

BRIEF DESCRIPTION OF THE DRAWINGS

Embodiments of the invention will now be described by way of example only, with reference to the accompanying drawings, in which:

FIG. 2 a cross section focusing on a poppet valve assembly of the pressure relief valve and flow control spool of FIG. 1.

DETAILED DESCRIPTION

Figure 1:
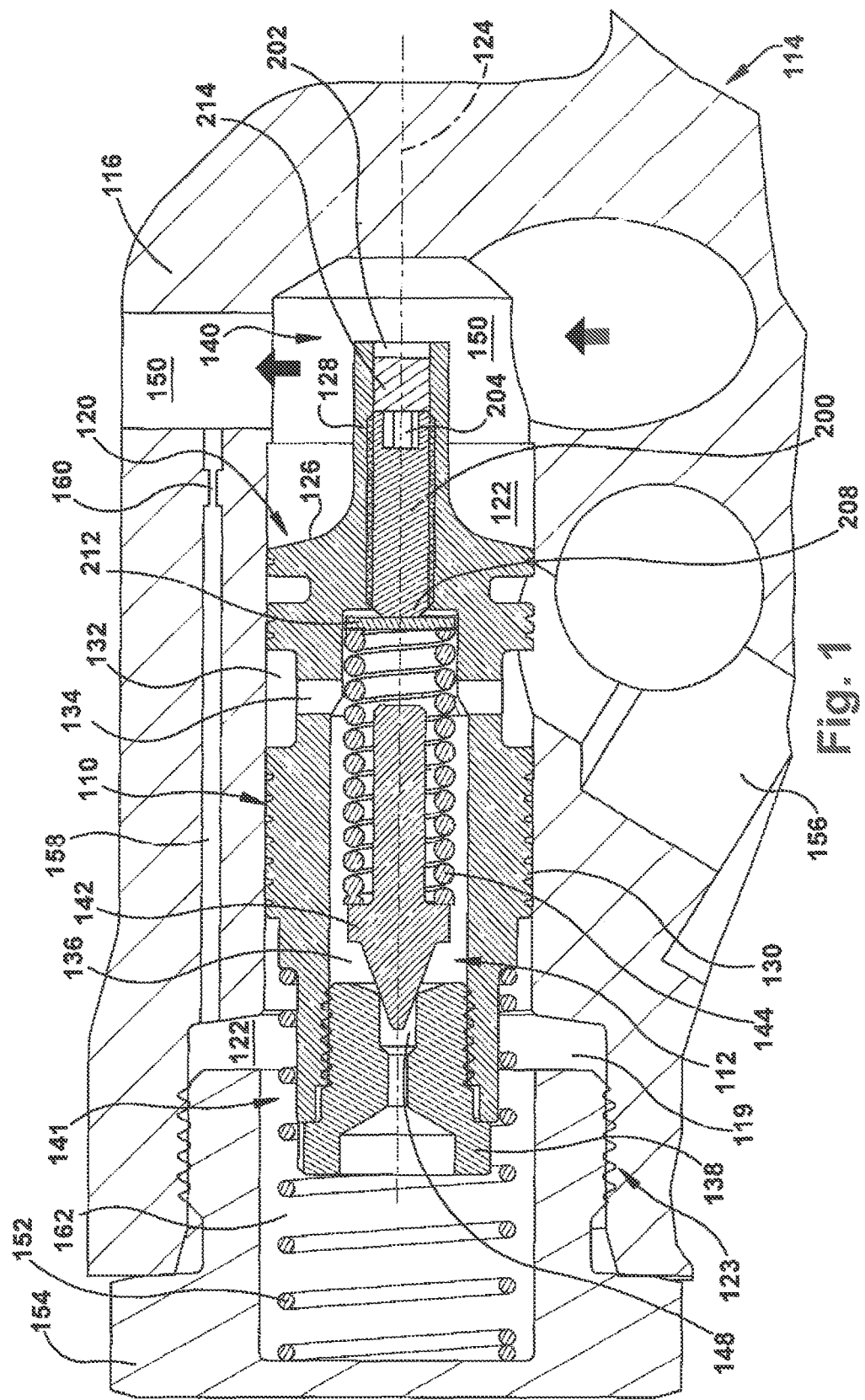
FIG. 1 is a cross section of part of a pump including a pressure relief valve and flow control spool constructed in accordance with the present invention.

In accordance with the present invention, a pressure relief valve 110 (FIG. 1) includes a poppet valve assembly 112 (FIG. 2). The pressure relief valve 110 is arranged to selectively relieve pressure generated by a pump 114. In one example, the pump 114 can pressurize hydraulic fluid for use in a fluid power assist steering system. However, it is contemplated that hydraulic fluid pressurized by the pump 114 may be used in any other desired application.

The pressure relief valve 110 includes a housing 116. In one example, the housing 116 can be integrally formed with the pump 114. However, it is contemplated that the housing 116 may be formed separately from the pump 114 and subsequently attached. Additionally, it is contemplated that the housing 116 may be provided remotely from the pump 114 with fluid communication between the housing 116 and the pump 114 being provided by a suitable connection (e.g., hydraulic lines).

A cavity 119 is formed n the housing 116. The cavity 119 includes a seat receiving portion 123 that receives a seat 154. The seat 154 and the cavity 119 collectively define a chamber 122. The relief valve 110 includes a spool 120 disposed in the chamber 122. A spring 152 is received in a spring cavity 162 of the seal 154. The spring 152 is arranged to bias the spool 120 away from the seat 154.

The spool 120 has a first axial end 140 and a second axial end 141. A rod portion 128 is provided at the first axial end 140 of the spoof 120. The rod portion 128 projects from a land 126. A second land 130 is located between the first axial end 140 and the second axial end 141. A groove 132 is provided between the lands 126, 130. One or more vent passages 134 extend radially inward from the groove 132 to a central cavity 136 formed in the spool 120.

A poppet seat 138 is screwed into the second end 141 of the spool 120. A poppet 142 is disposed in the central cavity 136. A poppet spring 144 biases the poppet 142 into engagement with the poppet seat 138. An opening 148 is provided in the poppet seat 138. Fluid flow through the opening 148 is blocked when the poppet 142 engages the poppet seat 138.

A bore 202 is provided in the rod portion 128. A set screw 200 is screwed into the bore 202. The set screw 200 is coincident with a longitudinal axis 124 of the spool 120. The set screw 200 has a first axial end 206 and an opposite second axial end 206. A tool cavity 204 is provided at the first axial end 206 of the set screw 200. A seat engaging portion 208 is provided at the second axial end 210 of the set screw 200. The seat engaging portion 208 engages a disc 212 that is disposed between the set screw 200 and the poppet spring 144. A jam screw 214 is screwed into the bore 202. The jam screw 214 abuts the first end 206 of the set screw 200.

The housing 116 includes an outlet passage 150 and a pressure relief port 156. The outlet passage 150 provides a fluid communication path between the pump 114 and the fluid power assist steering system. As will be explained below, the spool 120 is moveable along the longitudinal axis 124 in the chamber 122 to permit fluid communication between the outlet passage 150 and the pressure relief port 156 such that an output pressure of the pump 114 is reduced. The housing 116 includes a conduit 158 having a flow-restricting orifice 160. The conduit 158 provides a fluid communication path between the outlet passage 150 and the spring cavity 162.

As appreciated by those skilled in the art, a fluid power assist steering system is designed to operate at a maximum pressure level. As will now be explained, the pressure relief valve 110 is arranged to limit the output pressure of the pump 114 to the maximum pressure level of the fluid power assist steering system.

The pump 114 is energized to pump fluid through the passage 150 and provide operating pressure to the fluid power assist steering system. The hydraulic pressure of the fluid flowing through the passage 150 acts on the spool 120 to urge the spool 120 to the left (as viewed in FIG. 1) toward the seat 154 against the force of the spring 152. The conduit 158 communicates a portion of the fluid flowing through the passage 150 to the spring cavity 162, thereby generating hydraulic pressure in the spring cavity 162.

The hydraulic pressure in the spring cavity 162 acts on the poppet 142 to urge the poppet 142 to the right (as viewed in FIG. 1) away from the poppet seat 138. However, the poppet 142 remains engaged with the poppet seat 138 when the hydraulic pressure of the fluid in the passage 150 is below the maximum pressure level of the fluid power assist steering system. Thus, the hydraulic pressure in the spring cavity 162 is trapped. The trapped spring cavity 162 hydraulic pressure, in combination with the biasing force of the spring 152, urges the spool 120 to the right (as viewed in FIG. 1) against the hydraulic pressure in the passage 150. However, because the combined force of the hydraulic pressure in the spring cavity 162 and the biasing force of the spring 152 is less than the force of the hydraulic pressure of the fluid flowing through the passage 150, the spool 120 is maintained in a position where fluid communication between the outlet passage 150 and the pressure relief port 156 is blocked. That is, the spool 120 is maintained in a position where the first land 126 is disposed to the right of the pressure relief port 156 (as viewed in FIG. 1).

When the hydraulic pressure of the fluid flowing through the passage 150 exceeds the maximum pressure level of the fluid power assist steering system, the hydraulic pressure in the spring cavity 162 increases to a pressure that is great enough to move the poppet 142 off of the poppet seat 138. Moving the poppet 142 off of the poppet seat 138 establishes fluid communication between the spring cavity 162 and the central cavity 136. The fluid previously trapped in the spring cavity 162 is thus released through the spool 120 and to the pressure relief port 156 via the vent passages 134. Venting the fluid through the spool 120 and to the pressure relief port 156 reduces the hydraulic pressure in the spring cavity 162. The hydraulic pressure of the fluid flowing through the passage 150 is now greater than the combined biasing force of the spring 152 and the reduced pressure in the spring cavity 162. As a result, the spool 120 is moved to the left (as viewed in FIG. 1) and fluid communication between the passage 150 and the pressure relief port 156 is permitted. That is, the spool 120 is moved to a position where the first land 126 is disposed to the left of the pressure relief port 156. In this position, a portion of fluid flowing through the passage 150 is diverted to the pressure relief port 156, thereby reducing the output pressure of the pump 114 to the maximum pressure level of the fluid power assist steering system.

The output pressure of the pump 114 can be adjusted by, among other design variables, varying the biasing force of the poppet spring 144 on the poppet 142 into engagement with the poppet seat 138. This biasing force is increased or decreased by increasing or decreasing, respectively, the compression level of the poppet spring 144. Increasing the compression level of the poppet spring 144 will increase the level of hydraulic pressure in the spring cavity 162 that is necessary to move the poppet 142 off of the poppet seat 138, thereby increasing the maximum output pressure of the pump 114. Decreasing the compression level of the poppet spring 144 will decrease the level of hydraulic pressure in the spring cavity 162 that is necessary to move the poppet 142 off of the poppet seat 138, thereby decreasing the maximum output pressure of the pump 114.

The compression level of the poppet spring 144 is controlled by the set screw 200. A tool can be engaged in the tool cavity 204 to facilitate rotation of the set screw 200 about the longitudinal axis 124. Rotating the set screw 200 about the longitudinal axis 124 causes the set screw 200 to move along the longitudinal axis 124 and adjust the compression level of the poppet spring 144. Specifically, rotating the set screw 200 in a first direction about the longitudinal axis 124 moves the set screw 200 along the longitudinal axis 124 toward the poppet 142 and advances the disc 212 toward the poppet 142. The advancing disk 212 compresses the poppet spring 144, thereby increasing the compression level of the poppet spring 144. Rotating the set screw 200 in a second direction about the longitudinal axis 124 opposite the first direction moves the set screw 200 along the longitudinal axis 124 away from the poppet 142. The disk 212 retreats away from the poppet 142 under the force of the poppet spring 144, thereby decreasing the compression level of the poppet spring 144. Once the set screw 200 is located at a position in the bore 202 that provides the desired maximum output pressure, the jam screw 214 can be screwed into abutment with the first end 206 of the set screw 200, thereby fixing the location of the set screw 200 in the bore 202. It is contemplated that the jam screw 214 can be omitted and, instead, threadlocker (e.g., nylon or other suitable material) can be bonded to the set screw 200 threads to fix the location of the set screw 200 in the bore 202.

The set screw 200 can be moved in the bore 202 to an infinite number of locations along the longitudinal axis 124. Consequently, the compression level of the poppet spring 144 can be infinitely adjusted, thereby allowing for precise setting of the maximum output pressure of the pump 114. Furthermore, the compression level of the poppet spring 144 can be adjusted without complete disassembly of the relief valve 110. Additionally, because the movement of the set screw 200 along the longitudinal axis 124 relative to the spool 120 in the bore 202 is a direct function of the amount of rotation of the set screw 200, the set screw 200 can be moved in the bore 202 a predetermined distance by rotating the set screw 200 a predetermined angle. Thus, the compression of the poppet spring 144 can be accurately adjusted by tracking rotation of the set screw 200.

From the above description of the invention, those skilled in the art will perceive improvements, changes and modifications. Such improvements, changes and modifications within the skill of the art are intended to be covered by the appended claims.

The invention claimed is:

1. A pressure relief valve for a fluid power assist steering system pump comprising:
    a housing;
    a spool disposed in the housing, the spool defining a cavity and having a first end and a second end, the spool being movable in the housing to limit an output pressure of a pump;
    a poppet seat secured to the second end of the spool;
    a poppet disposed in the cavity;
    a poppet spring biasing the poppet into engagement with the poppet seat; and
    a set screw received in the first end of the spool, the set screw being rotatable relative to the spool to adjust a compression level of the poppet spring.

2. The pressure relief valve of claim 1, wherein the compression level of the poppet spring corresponds to the output pressure limit of the pump.

3. The pressure relief valve of claim 2, wherein increasing the compression level of the poppet spring increases the output pressure limit of the pump and decreasing the compression level of the poppet spring decreases the output pressure limit of the pump.

4. The pressure relief valve of claim 1 comprising a jam screw received in the first end of the spool, the jam screw abutting the set screw.

5. The pressure relief valve of claim 1 comprising threadlocker applied to threads of the set screw.

6. The pressure relief of claim 1 comprising a disc disposed between the poppet spring and the set screw.

7. The pressure relief valve of claim 1, wherein the set screw includes a tool cavity for receiving a tool that can be used to rotate the set screw relative to the spool.

8. The pressure relief valve of claim 1, wherein rotation of the set screw relative to the spool causes axial movement of the set screw relative to the spool.

9. The pressure relief valve of claim 1 comprising:
a spool spring; and
wherein the housing has an outlet passage and a pressure relief port, the outlet passage providing a fluid communication path between the pump and a fluid power assist steering system, the pressure relief port being arranged to reduce the output pressure of the pump, the spool spring biasing the spool to a position where fluid communication between the outlet passage and the pressure relief port is blocked.

10. The pressure relief valve of claim 9, wherein the spool is movable by pressure in the outlet passage against the bias of the spool spring to a position where fluid communication between the outlet passage and the pressure relief port is permitted.

11. The pressure relief valve of claim 10, wherein the poppet is arranged to be moved by hydraulic pressure generated by the fluid flowing through the outlet passage to block fluid from flowing through the poppet seat or allow fluid to flow through the poppet seat and into the cavity.

12. The pressure relief valve of claim 11, wherein the spool includes a vent passage that allows fluid to flow from the cavity to the pressure relief port.

13. The pressure relief valve of claim 12, wherein the spool moves to a position that permits fluid communication between the outlet passage when the poppet is moved to permit fluid to flow through the poppet seat into the cavity and to the pressure relief port.

* * * * *